(12) United States Patent
Aman et al.

(10) Patent No.: US 10,777,355 B2
(45) Date of Patent: *Sep. 15, 2020

(54) DIELECTRIC COMPOSITION, DIELECTRIC ELEMENT, ELECTRONIC COMPONENT, AND MULTILAYER ELECTRONIC COMPONENT

(71) Applicant: TDK CORPORATION, Tokyo (JP)

(72) Inventors: Sanshiro Aman, Tokyo (JP); Hiroki Akiba, Tokyo (JP); Keiko Takeuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/087,790

(22) PCT Filed: Mar. 6, 2017

(86) PCT No.: PCT/JP2017/008802
§ 371 (c)(1),
(2) Date: Sep. 24, 2018

(87) PCT Pub. No.: WO2017/163842
PCT Pub. Date: Sep. 28, 2017

(65) Prior Publication Data
US 2019/0115154 A1 Apr. 18, 2019

(30) Foreign Application Priority Data

Mar. 24, 2016 (JP) .................................. 2016-060421

(51) Int. Cl.
*H01G 4/12* (2006.01)
*C04B 35/495* (2006.01)
(Continued)

(52) U.S. Cl.
CPC ......... *H01G 4/1254* (2013.01); *C04B 35/495* (2013.01); *C04B 35/499* (2013.01);
(Continued)

(58) Field of Classification Search
CPC ... C04B 35/465; C04B 35/468; C04B 35/495; H01G 4/1254; H01G 4/1245; H01G 4/1236; H01G 4/1227; H01G 4/1263
See application file for complete search history.

(56) References Cited

U.S. PATENT DOCUMENTS 5,668,694 A * 9/1997 Sato ..................... B32B 18/00
257/295
10,354,799 B2 * 7/2019 Nomura ................ C04B 35/638
(Continued)

FOREIGN PATENT DOCUMENTS

CN 102627471 A 8/2012
JP H03-274607 A 12/1991
(Continued)

OTHER PUBLICATIONS

M. C. Stennett, et. al, "Dielectric and structural studies of Ba 2 M Ti 2 Nb 3 O 15 ( B M TNO 15 , M=Bi 3+ , La 3+ , Nd 3+ , Sm 3+ , Gd 3+ ) tetragonal tungsten bronze-structured ceramics", Journal of Applied Physics, vol. 101, pp. 104114-1-104114-7, 2007.
(Continued)

*Primary Examiner* — Karl E Group
(74) *Attorney, Agent, or Firm* — Oliff PLC

(57) ABSTRACT

[Object] provide a dielectric composition with high voltage resistance and favorable reliability, and an electronic component using the dielectric composition.

[Solving Means] A dielectric composition contains, as a main component, a tungsten bronze type composite oxide represented by a chemical formula $(Sr_{1.00-s-t}Ba_sCa_t)_{6.00-x}R_x(Ti_{1.00-a}Zr_a)_{x+2.00}(Nb_{1.00-b}Ta_b)_{8.00-x}O_{30.00}$, in which the R is at least one element selected from Y, La, Pr, Nd, Sm, Eu, Gd, Tb, Dy, Ho, Er, Tm, Yb, and Lu, and s, t, x, a, and b satisfy $0.70 \leq s \leq 1.00$, $0 \leq t \leq 0.30$, $0.70 \leq s+t \leq 1.00$, $0 \leq x \leq 0.50$, $0.10 \leq a \leq 1.00$, and $0 \leq b \leq 1.00$. At least one or more elements selected from Mn, Mg, Co, V, W, Mo, Si, Li, B, and Al are contained as a sub component in 0.10 mol or more and 20.00 mol or less with respect to 100 mol of the main component.

6 Claims, 1 Drawing Sheet

(51) Int. Cl.
  *C04B 35/49* (2006.01)
  *H01G 4/30* (2006.01)
  *C04B 35/499* (2006.01)
  *H01B 3/02* (2006.01)
  *C04B 35/626* (2006.01)

(52) U.S. Cl.
  CPC .............. *C04B 35/626* (2013.01); *H01B 3/02* (2013.01); *H01G 4/1263* (2013.01); *H01G 4/30* (2013.01); *H01G 4/1227* (2013.01); *H01G 4/1245* (2013.01)

(56) References Cited

U.S. PATENT DOCUMENTS

| | | | |
|---|---|---|---|
| 2008/0045399 A1 | 2/2008 | Takeda et al. | |
| 2009/0105063 A1* | 4/2009 | Luo ..................... | C04B 35/465 501/123 |
| 2018/0240594 A1* | 8/2018 | Nomura ............... | H01G 4/1227 |
| 2019/0103222 A1* | 4/2019 | Aman .................... | C04B 35/01 |
| 2019/0112235 A1* | 4/2019 | Akiba ................... | C04B 35/495 |
| 2019/0115154 A1* | 4/2019 | Aman .................... | C04B 35/495 |
| 2019/0256425 A1* | 8/2019 | Akiba ................... | C04B 35/495 |

FOREIGN PATENT DOCUMENTS

| | | |
|---|---|---|
| JP | H11-224827 A | 8/1999 |
| WO | WO-2005075378 A1 * 8/2005 ........... C04B 35/495 |
| WO | 2006/114914 A1 | 11/2006 |

OTHER PUBLICATIONS

Mu Xin Cao et. al, "Crystal Structure and Ferroelectric Behaviors of Ba5SmTi3Ta7O30 and Ba4Sm2Ti4Ta6O30 Tungsten Bronze Ceramics", Laboratory of Dielectric Materials, Department of Materials Science and Engineering, Zhejiang University, J. Am. Ceram. Soc., vol. 93, No. 3, pp. 782-786, 2010.

Zhang, Shan-Tao et al., "Structural Evolving Sequence and Porous Ba6Zr2Nb8O30 Ferroelectric Ceramics with Ultrahigh Breakdown Field and Zero Strain", Journal of American Ceramic Society, Feb. 2013, vol. 96, No. 2, pp. 555-560.

May 30, 2017 International Search Report issued in International Patent Application No. PCT/JP2017/008802.

Sep. 25, 2018 International Preliminary Report on Patentability issued in International Patent Application No. PCT/JP2017/008802.

* cited by examiner

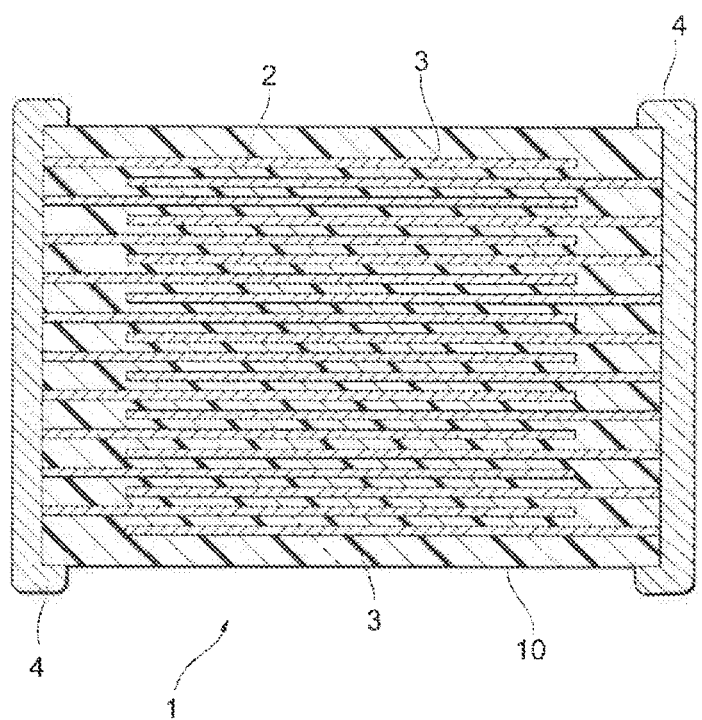

DIELECTRIC COMPOSITION, DIELECTRIC ELEMENT, ELECTRONIC COMPONENT, AND MULTILAYER ELECTRONIC COMPONENT

TECHNICAL FIELD

The present invention relates to a dielectric composition, a dielectric element, an electronic component, and a multilayer electronic component which are suitably used particularly under a high-temperature environment such as in-vehicle use.

BACKGROUND ART

For example, a multilayer ceramic capacitor is used in a variety of electronic equipment because of high reliability and low cost thereof. Specifically, information terminals, home electronics, automobile electronic components, and the like are exemplified. In particular, a multilayer ceramic capacitor for in-vehicle use is often used in a high-temperature region as compared to a multilayer ceramic capacitor used in information terminals or home electronics, and securement up to a higher-temperature region is required. For this reason, a dielectric material used in the multilayer ceramic capacitor is required to have a high specific permittivity, high specific resistance, and high voltage resistance even in the high-temperature region.

Patent document 1 discloses a dielectric ceramic composition exhibiting a high specific permittivity at room temperature and having high specific resistance even in a high-temperature range of 180° C. Specifically, disclosed is a technology relating to a multilayer ceramic capacitor using a dielectric ceramic composition containing, as a main component, a tungsten bronze type composite oxide represented by a composition formula $(K_{1-y}Na_y)Sr_2Nb_5O_{15}$ (provided that, $0 \leq y < 0.2$) and containing a first sub component and a second sub component in 0.1 part by mol or more and 40 parts by mol or less with respect to 100 parts by mol of the main component.

However, as understood from the composition formula, in the patent document 1, potassium (K) and sodium (Na) that are alkali metal elements are contained as constituent elements of the main component. Since the alkali metal has high volatility, there is a problem in that handling at the time of manufacturing is prone to be cumbersome, for example, a process of filling an alkali metal element needs to be introduced in processes.

Further, when the alkali metal with high volatility is contained, there are problems in that a lattice defect caused by the alkali metal easily occurs in the dielectric composition by a binder removal process and a firing process that perform a heat treatment at a high temperature, or a reoxidation process, and high voltage resistance is difficult to obtain. Therefore, in the patent document 1, there is no disclosure of a technology relating to a high specific permittivity and high voltage resistance in the high-temperature region.

Further, patent document 2 discloses a technology relating to a ceramic capacitor which includes a dielectric ceramic layer obtained by adding a plurality of additives to a perovskite type oxide formed by a composition formula $(Ca_{1-x}(Ba,Sr)_x)_k(Zr_{1-y}Ti_y)O_3$ having a high quality factor Q at 20° C., a favorable temperature coefficient, and high voltage resistance at 150° C.

In the patent document 2, high voltage resistance is exhibited in a high-temperature region of 150° C., but there are problems in that the specific permittivity at 20° C. is only about 125 at a maximum and a desired capacitance is difficult to obtain in a high-temperature region of 175° C. or higher that is expected to be used hereafter.

Further, non-patent document 1 discloses a technology relating to a tungsten bronze type dielectric $Ba_2MTi_2Nb_3O_{15}$ ($M=Bi^{3+}$, $La^{3+}$, $Nd^{3+}$, $Sm^{3+}$, $Gd^{3+}$) with a high specific permittivity and a small dielectric loss. The tungsten bronze type dielectric has a high specific permittivity at room temperature of about 100 to 700 and a favorable value of tan $\delta$ at room temperature of 5% or less. In addition, non-patent document 2 discloses a technology relating to a tungsten bronze type dielectric $Ba_2Sm_2Ti_4Ta_6O_{30}$ with a high specific permittivity and a small dielectric loss. The tungsten bronze type dielectric has a high specific permittivity at room temperature of about 120 and a favorable value of tan $\delta$ at room temperature of 3% or less. However, the non-patent document 1 has a problem in that a change ratio of the specific permittivity at 200° C. to the specific permittivity at room temperature is large.

CITATION LIST

Patent Document

Patent document 1: WO 2006/114914 A
Patent document 2: JP 11-224827 A

Non-Patent Document

Non-patent document 1: JOURNAL OF APPLIED PHYSICS 101, 104114 (2007) "Dielectric and structural studies of $Ba_2MTi_2Nb_3O_{15}$ (BMTNO$_{15}$, $M=Bi^{3+}$, $La^{3+}$, $Nd^{3+}$, $Sm^{3+}$, $Gd^{3+}$) tetragonal tungsten bronze-structured ceramics"

Non-patent document 2: Journal of the American Ceramic Society, 93[3] 782-786 (2010) "Crystal structure and ferroelectric behaviors of $Ba_5SmTi_3Ta_7O_{30}$ and $Ba_4Sm_2Ti_4Ta_6O_{30}$ tungsten bronze ceramics"

SUMMARY OF THE INVENTION

Problem Solved by the Invention

The present invention is made in view of the above-described problems, and aims to provide a dielectric composition which is suitably used under a high-temperature environment of 175° C. or higher, such as in-vehicle use, and has a high specific permittivity as well as high DC voltage resistance and high specific resistance, and a dielectric element, an electronic component, and a multilayer electronic component which use the dielectric composition.

Means for Solving Problem

In order to achieve the object, a dielectric composition of the present invention contains, as a main component, a tungsten bronze type composite oxide represented by a chemical formula $(Sr_{1.00-s-t}Ba_sCa_t)_{6.00-x}R_x(Ti_{1.00-a}Zr_a)_{x+2.00}(Nb_{1.00-b}Ta_b)_{8.00-x}O_{30.00}$, in which the R is at least one element selected from Y, La, Pr, Nd, Sm, Eu, Gd, Tb, Dy, Ho, Er, Tm, Yb, and Lu, and s, t, x, a, and b satisfy $0.70 \leq s \leq 1.00$, $0 \leq t \leq 0.30$, $0.70 \leq s+t \leq 1.00$, $0 \leq x \leq 0.50$, $0.10 \leq a \leq 1.00$, and $0 \leq b \leq 1.00$.

With the above-described dielectric composition, it is possible to obtain a dielectric composition which is suitably used under a high-temperature environment and has a high specific permittivity as well as high DC voltage resistance and high specific resistance.

Further, as a desirable embodiment of the present invention, it is preferable that at least one selected from Mn, Mg, Co, V, W, Mo, Si, Li, B, and Al is contained as a sub component in 0.10 mol or more and 20.00 mol or less with respect to 100 mol of the main component. Accordingly, higher specific resistance, higher DC voltage resistance, and a higher specific permittivity are easily obtained.

A dielectric element according to the present invention preferably includes the above-described dielectric composition.

When the dielectric element according to the present invention includes the above-described dielectric composition, the dielectric element can be used under a high-temperature environment such as in-vehicle use.

Further, an electronic component according to the present invention preferably includes a dielectric layer formed by the above-described dielectric composition.

A multilayer electronic component according to the present invention includes a multilayer portion obtained by alternately stacking a dielectric layer formed by the above-described dielectric composition and an internal electrode layer.

When the electronic component and the multilayer electronic component according to the present invention include a dielectric layer formed by the above-described dielectric composition, the electronic component and the multilayer electronic component can be used under a high-temperature environment such as in-vehicle use.

The use application of the electronic component having a dielectric layer formed by the dielectric composition according to the present invention is not particularly limited, but the electronic component is useful for a multilayer ceramic capacitor, a piezoelectric element, a chip varistor, a chip thermistor, and the like.

Effect of the Invention

The present invention can provide a dielectric composition which is suitably used under a high-temperature environment of 175° C. or higher, such as in-vehicle use, and has high DC voltage resistance, a high specific permittivity, and high specific resistance, and a dielectric element, an electronic component, and a multilayer electronic component which use the dielectric composition.

BRIEF DESCRIPTION OF DRAWINGS

FIGURE illustrates a cross-sectional view of a multilayer ceramic capacitor according to an embodiment of the present invention.

MODE(S) FOR CARRYING OUT THE INVENTION

Hereinafter, embodiments of the present invention will be described.

A dielectric composition according to the present embodiment contains, as a main component, a tungsten bronze type composite oxide represented by a chemical formula $(Sr_{1.00-s-t}Ba_sCa_t)_{6.00-x}R_x(Ti_{1.00-a}Zr_a)_{x+2.00}(Nb_{1.00-b}Ta_b)_{8.00-x}O_{30.00}$, in which the R is at least one element selected from Y, La, Pr, Nd, Sm, Eu, Gd, Tb, Dy, Ho, Er, Tm, Yb, and Lu, and s, t, x, a, and b satisfy $0.70 \leq s \leq 1.00$, $0 \leq t \leq 0.30$, $0.70 \leq s+t \leq 1.00$, $0 \leq x \leq 0.50$, $0.10 \leq a \leq 1.00$, and $0 \leq b \leq 1.00$.

When the dielectric composition according to the present embodiment contains, as a main component, a tungsten bronze type composite oxide represented by the chemical formula, high voltage resistance is easily obtained. Regarding the reason for this, the present inventors consider as follows. Since the tungsten bronze type composite oxide as the main component of the present embodiment has a characteristic that the bandgap is wide, electrons in the valence band are difficult to excite to the conduction band so that a carrier concentration of electrons that are a majority carrier involved in conduction can be suppressed. In addition, it is considered that the carrier concentration of conduction electrons that are a majority carrier affects electron avalanche that is a typical breakdown triode of the voltage resistance. In the dielectric composition of the present invention, since the carrier concentration of electrons that are a majority carrier can be suppressed to be low, it is considered that breakdown caused by electron avalanche is difficult to occur. Further, since the bandgap is wide, a certain degree of width of the bandgap can be maintained even when high field strength is applied, and thus it is considered that high voltage resistance is easily obtained even in a high electric field. In addition, since an alkali metal is not contained, a lattice defect is difficult to occur and conduction electrons are difficult to generate so that the dielectric composition of the present invention has a characteristic that the specific resistance and the voltage resistance high.

When s and t in the chemical formula are $0.70 \leq s \leq 1.00$, $0 \leq t \leq 0.30$, and $0.70 \leq s+t \leq 1.00$, high voltage resistance is easily obtained. Preferably, when s and t in the chemical formula are $0.80 \leq s \leq 1.00$, $0 \leq t \leq 0.20$, and $0.80 \leq s+t \leq 1.00$, higher voltage resistance is easily obtained. On the other hand, in a case where K or Na that is an alkali metal element is contained in addition to Sr, Ba, and Ca, since volatility of these elements is high, a lattice defect occurs, and as a result, there is a tendency that high voltage resistance is difficult to obtain. In addition, t represents a substitution amount of Ca. Ca is an arbitrary component and an upper limit of the substitution amount thereof is 0.30.

When x in the chemical formula is $0 \leq x \leq 0.50$, the specific permittivity increases at room temperature and in the high-temperature region. In a case where an abundance ratio of R having a relatively small ionic radius among Sr, Ba, Ca, and R (R is at least one element selected from Y, La, Pr, Nd, Sm, Eu, Gd, Tb, Dy, Ho, Er, Tm, Yb, and Lu) constituting the A site of the tungsten bronze type composite oxide is small, although the definite reason is not clear, it is considered that an octahedron formed by Ti, Zr, Nb, Ta, and O constituting the B site is likely to be inclined with respect to a c axis direction. This octahedron has intrinsic polarization by a B site ion slightly deviated from the center position and is inclined with respect to the c axis direction. Further, the octahedron oscillates due to oscillating electric field, that is, polarization oscillates, and thus a higher specific permittivity is considered to be exhibited. In addition, x represents a substitution amount of R. R is an arbitrary component and an upper limit of the substitution amount thereof is 0.50.

When R in the chemical formula is at least one element selected from Y, La, Pr, Nd, Sm, Eu, Gd, Tb, Dy, Ho, Er, Tm, Yb, and Lu, high voltage resistance is easily obtained even in the high-temperature region.

When a tungsten bronze type composite oxide in which x in the chemical formula is $0 \leq x \leq 0.50$, for example, which is represented by $(Sr_{1.00-s-t}Ba_sCa_t)_{6.00}(Ti_{1.00-a}Zr_a)_{2.00}$ $(Nb_{1.00-b}Ta_b)_{8.00}O_{30.00}$ in the case of x=0 is used as the main component, a high specific permittivity is easily obtained even at room temperature and in the high-temperature region. On the other hand, in a case where x is more than 0.50, for example, in a composite oxide of a chemical formula $Ba_5LaTi_3Nb_7O_{30}$, or the like, the specific permittivity at room temperature is decreased.

When a substitution amount a of Zr in the chemical formula is $0.10 \leq a \leq 1.00$, since the bandgap becomes wide, high voltage resistance is easily obtained. On the other hand, in a case where the substitution amount a is less than 0.10, the bandgap is difficult to widen, and as a result, high voltage resistance is difficult to obtain.

Further, when the substitution amount a of Zr in the chemical formula is $0.50 \leq a \leq 1.00$, since the bandgap becomes wider, higher voltage resistance is easily obtained.

Also in a composite oxide in which Nb in the chemical formula is substituted with Ta, a tungsten bronze type crystal structure can be maintained, and when a substitution amount b of Ta is set to $0.10 \leq b \leq 1.00$, higher voltage resistance is easily obtained.

As the sub component, it is preferable that at least one or more elements selected from Mn, Mg, Co, V, W, Mo, Si, Li, B, and Al are contained. Owing to an interaction between Zr contained in the main component and these elements, high voltage resistance and high specific resistance are easily obtained. Preferably, when the substitution amount a of Zr is set to $0.80 \leq a \leq 1.00$, the interaction is enhanced so that higher voltage resistance is easily obtained.

When the amount of the sub component is set to 0.10 mol or more and 20.00 mol or less with respect to 100 mol of the main component, high specific resistance of $9.00 \times 10^{12}$ Ωcm or more can be obtained at 200° C. Moreover, higher voltage resistance can be obtained even at a high temperature of 175° C. or higher, Further, other than contained in the main component, at least one element selected from Y, La, Pr, Nd, Sm, Fa, Gd, Tb, Dy, Ho, Er, Tm, Yb, and Lu may be contained as a second sub component. The second sub component is an arbitrary component and an upper limit of the amount thereof is determined in a range within which the object of the invention can be achieved.

Incidentally, the dielectric composition may further contain fine impurities or other sub components as long as they do not deteriorate dielectric properties that are the effects of the present invention, that is, the specific permittivity, the specific resistance, and the voltage resistance. Therefore, the amount of the main component is not particularly limited, and for example, is 50 mol % or more and 100 mol % or less with respect to the whole dielectric composition containing the main component.

Next, description will be given using a multilayer con capacitor as an example. Figure illustrates a multilayer ceramic capacitor according to an embodiment of the present invention, A multilayer ceramic capacitor 1 has a capacitor element main body 10 having a configuration in which a dielectric layer 2 and an internal electrode layer 3 are alternately stacked. A pair of external electrodes 4, which is conductive with each of the internal electrode layers 3 alternately disposed inside the element main body 10, is formed at both ends of the capacitor element main body 10. The shape of the capacitor element main body 10 is not particularly limited, and is typically a rectangular parallelepiped shape. In addition, the dimension thereof is also not particularly limited, and the dimension may be appropriately determined depending on the use application.

The thickness of the dielectric layer 2 is not particularly limited, and may be appropriately determined depending on the use application of the multilayer ceramic capacitor 1.

The conductive material contained in the internal electrode layer 3 is not particularly limited, and is preferably Ni, Pd, Ag, a Pd—Ag alloy, Cu, or a Cu-based alloy. Incidentally, a trace amount of various components such may be contained in about 0.1% by weight or less in Ni, Pd, Ag, a Pd—Ag alloy, Cu, or a Cu-based alloy. In addition, the internal electrode layer 3 may be formed using a commercially available paste for an electrode. The thickness of the internal electrode layer 3 may be appropriately determined depending on the use application or the like.

Next, an example of a method for manufacturing the multilayer ceramic capacitor illustrated in FIGURE will be described.

The multilayer ceramic capacitor 1 of the present embodiment is manufactured by producing a green chip by a typical printing method or sheet method using a paste, firing the green chip, then applying an external electrode to the green chip, and firing the obtained product, similarly to a multilayer ceramic capacitor of the related art. Hereinafter, the manufacturing method will be described in detail.

An example of the method for manufacturing the multilayer ceramic capacitor according to the present embodiment will be described.

First, raw materials are prepared such that the main component has a desired proportion, and are mixed and heat-treated (calcined) at 800° C. or higher. Thus, calcined powder can be obtained. Preferably, a heat treatment is performed at 800° C. to 1000° C. such that the particle size of the calcined powder is 0.1 μm or more and 5.0 μm or less. It is preferable that a different phase such as $Ba_5Nb_4O_{15}$ having an anisotropic shape is not contained in the calcined powder.

Regarding the raw materials, an oxide mainly configured by Sr, Ba, Ca, Ti, Zr, Nb, or Ta, or a mixture thereof can be used as raw material powder. Moreover, the raw materials can be appropriately selected from various compounds that become the aforementioned oxide or composite oxide by firing, for example, carbonate, oxalate, nitrate, hydroxide, an organometallic compound, and the like and can be mixed for use. Specifically, SrO or $SrCO_3$ may be used as a raw material of Sr.

Further, in a case where the dielectric composition according to the present embodiment contains a sub component, a raw material of the sub component is also prepared. The raw material of the sub component is not particularly limited, and oxides of respective components or mixtures thereof can be used as raw material powder. Moreover, the raw materials can be appropriately selected from various compounds that become the aforementioned oxide or composite oxide by firing, for example, carbonate, oxalate, nitrate, hydroxide, an organometallic compound, and the like and can be mixed for use. Specifically, MgO or $MgCO_3$ may be used as a raw material of Mg.

The prepared calcined powder a the main component and the raw material of the sub component are weighed to have a predetermined compositional ratio and mixed, thereby obtaining a dielectric composition raw material. Examples of a mixing method include wet mixing performed using a ball mill and thy mixing performed using a dry mixer.

This dielectric composition raw material is prepared in the form of a coating material to prepare a paste for a dielectric layer. The paste for a dielectric layer may be an organic coating material obtained by kneading a dielectric raw material and an organic vehicle or may be an aqueous coating material.

The organic vehicle is obtained by dissolving a binder in an organic solvent. The binder used in the organic vehicle is not particularly limited, and may be appropriately selected from typical various binders such as ethylcellulose and polyvinyl butyral. The organic solvent to be used is also not particularly limited, and may be appropriately selected from various organic solvents such as terpineol, butyl carbitol, and acetone depending on a method to be used such as a printing method or a sheet method.

Further, in a case where the paste for a dielectric material is produced in the form of an aqueous coating material, an aqueous vehicle obtained by dissolving a water-soluble binder a dispersant, or the like in water and a dielectric raw material may be kneaded. The water-soluble binder used in the aqueous vehicle is not particularly limited, and for example, polyvinyl alcohol, cellulose, a water-soluble acrylic resin, and the like may be used.

A paste for an internal electrode layer is prepared by kneading the above-described organic vehicle with conductive materials formed from various conductive metals or alloys described above, various oxides, which become the above-described conductive material after firing, an organometallic compound, resinate, or the like.

A paste for an external electrode may be prepared in the similar manner to the paste for an internal electrode layer described above.

The amount of the organic vehicle in each paste described above is not particularly limited, and may be a typical amount, for example, the amount of the binder may be about 1% by weight to 5% by weight and the amount of the solvent may be about 10% by weight to 50% by weight. In addition, additives selected from various dispersants, plasticizers, dielectric materials, insulator materials, and the like may be contained in each paste as necessary. The total amount of these additives is set to preferably 10% by weight or less.

In the case of using a printing method, the paste for a dielectric layer and the paste for an internal electrode layer are printed on a substrate such as PET, stacked, cut in a predetermined shape, and then peeled off from the substrate to obtain a green chip.

Further, in the case of using a sheet method, a green sheet is formed using the paste for a dielectric layer, the paste for an internal electrode layer is printed on the green sheet, and then these are stacked to obtain a green chip.

The green chip is subjected to a binder removal treatment before firing described later. As binder removal conditions, a temperature increase rate is set to preferably 5° C./hr to 300° C./hr, a retention temperature is set to preferably 180° C. to 500° C., and a temperature retention time is set to preferably 0.5 hours to 24 hours. In addition, the atmosphere of the binder removal treatment is set to air or reductive atmosphere.

Further, the retention temperature at the time of firing is preferably 1000° C. to 1400° C. and more preferably 1100° C. to 1360° C. When the retention temperature is less than the above ranges, densification is not sufficient. When the retention temperature exceeds the above ranges, disconnection of the electrode by abnormal sintering of the internal electrode layer and deterioration in capacity change ratio by diffusion of an internal electrode layer constituent material easily occur. In addition, when the retention temperature exceeds the above ranges, there is a concern that dielectric particles coarsen to decrease voltage resistance.

As firing conditions other than the above firing conditions, in order to achieve uniform firing of a chip, the temperature increase rate is set to preferably 50° C./hr 500° C./hr and more preferably 200° C./hr to 300° C./hr, and in order to control the particle size distribution after sintering within a range of 0.1 μm to 10.0 μm, the temperature retention time is set to preferably 0.5 hours to 24 hours and more preferably 1 hour to 3 hours, and the cooling rate is set to preferably 50° C./hr 500° C./hr and more preferably 200° C./hr to 300° C./hr.

In the above-described binder removal treatment, for example, a wetter or the like may be used in wetting of $N_2$ gas, mixed gas, or the like. In this ease, the water temperature is preferably about 5° C. to 75° C. In addition, the binder removal treatment, firing, and annealing may be performed consecutively or independently.

The capacitor element main body obtained as described above is polished at the end faces thereof, for example, by barrel polishing, sandblasting, or the like and the paste for an external electrode is applied and fired, thereby forming the external electrode 4. Then, as necessary, a coating layer is formed on the surface of the external electrode 4 by plating or the like.

Hereinbefore, the embodiments of the present invention have been described. The present invention is not limited to the aforementioned embodiments, and can be variously modified in a range not departing from the gist of the present invention.

EXAMPLES

Hereinafter, the present invention will be described in more detail by means of specific examples of the present invention. The present invention is not limited to these examples. Incidentally, specimens marked with ⨯ in Table 2 are outside the range of the present invention.

As a raw material of the main component, each powder of $SrCO_3$, $BaCO_3$, $CaCO_3$, $TiO_2$, $ZrO_2$, $Nb_2O_5$, $Ta_2O_5$, $Y_2O_3$, $La_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and $Bi_2O_3$ was prepared.

These materials were weighed to have the main component composition in Table 1, then wet-mixed with a ball mill, dried, and calcined at 800° C. to obtain calcined powder of the main component. A dielectric composition raw material was prepared. As a raw material of the sub component, each powder of $SiO_2$, MgO, $Co_2O_3$, $V_2O_5$, $WO_3$, $MoO_3$, MnO, $Li_2CO_3$, $B_2O_3$, $Al_2O_3$, and $Fe_3O_4$ was prepared and the main components and the sub components were mixed to respectively have a proportion in Table 1 to obtain dielectric composition raw materials of Specimen No. 1 to Specimen No. 63.

TABLE 1

| | | | | | | | | Accessory component [mol %] (with respect to 100 mol of main component) | | | | | | | | | | |
|---|---|---|---|---|---|---|---|---|---|---|---|---|---|---|---|---|---|---|
| | l-s-t | s | t | Re | x | a | b | Si | Mg | Co | V | W | Mo | Mn | Li | B | Al | Fe |
| Specimen No. 1 | 0.00 | 1.00 | 0.00 | La | 0.50 | 0.10 | 0.00 | — | — | — | — | — | — | — | — | — | — | — |
| Specimen No. 2 | 0.20 | 0.80 | 0.00 | La | 0.50 | 0.10 | 0.00 | — | — | — | — | — | — | — | — | — | — | — |
| Specimen No. 3 | 0.30 | 0.70 | 0.00 | La | 0.50 | 0.10 | 0.00 | — | — | — | — | — | — | — | — | — | — | — |
| ⨯Specimen No. 4 | 0.40 | 0.60 | 0.00 | La | 0.50 | 0.10 | 0.00 | — | — | — | — | — | — | — | — | — | — | — |
| Specimen No. 5 | 0.00 | 0.80 | 0.20 | La | 0.50 | 0.10 | 0.00 | — | — | — | — | — | — | — | — | — | — | — |

TABLE 1-continued

|  | l-s-t | s | t | Re | x | a | b | Accessory component [mol %] (with respect to 100 mol of main component) |  |  |  |  |  |  |  |  |  |  |
|---|---|---|---|---|---|---|---|---|---|---|---|---|---|---|---|---|---|---|
|  |  |  |  |  |  |  |  | Si | Mg | Co | V | W | Mo | Mn | Li | B | Al | Fe |
| Specimen No. 6 | 0.00 | 0.70 | 0.30 | La | 0.50 | 0.10 | 0.00 | — | — | — | — | — | — | — | — | — | — | — |
| Specimen No. 7 | 0.10 | 0.70 | 0.20 | La | 0.50 | 0.10 | 0.00 | — | — | — | — | — | — | — | — | — | — | — |
| ✗Specimen No. 8 | 0.00 | 0.60 | 0.40 | La | 0.50 | 0.10 | 0.00 | — | — | — | — | — | — | — | — | — | — | — |
| Specimen No. 9 | 0.10 | 0.80 | 0.10 | — | 0.00 | 0.10 | 0.00 | — | — | — | — | — | — | — | — | — | — | — |
| Specimen No. 10 | 0.10 | 0.80 | 0.10 | La | 0.25 | 0.10 | 0.00 | — | — | — | — | — | — | — | — | — | — | — |
| ✗Specimen No. 11 | 0.10 | 0.80 | 0.10 | La | 0.75 | 0.10 | 0.00 | — | — | — | — | — | — | — | — | — | — | — |
| Specimen No. 12 | 0.10 | 0.80 | 0.10 | Y | 0.50 | 0.10 | 0.00 | — | — | — | — | — | — | — | — | — | — | — |
| Specimen No. 13 | 0.10 | 0.80 | 0.10 | Pr | 0.50 | 0.10 | 0.00 | — | — | — | — | — | — | — | — | — | — | — |
| Specimen No. 14 | 0.10 | 0.80 | 0.10 | Nd | 0.50 | 0.10 | 0.00 | — | — | — | — | — | — | — | — | — | — | — |
| Specimen No. 15 | 0.10 | 0.80 | 0.10 | Sm | 0.50 | 0.10 | 0.00 | — | — | — | — | — | — | — | — | — | — | — |
| Specimen No. 16 | 0.10 | 0.80 | 0.10 | Eu | 0.50 | 0.10 | 0.00 | — | — | — | — | — | — | — | — | — | — | — |
| Specimen No. 17 | 0.10 | 0.80 | 0.10 | Gd | 0.50 | 0.10 | 0.00 | — | — | — | — | — | — | — | — | — | — | — |
| Specimen No. 18 | 0.10 | 0.80 | 0.10 | Tb | 0.50 | 0.10 | 0.00 | — | — | — | — | — | — | — | — | — | — | — |
| Specimen No. 19 | 0.10 | 0.80 | 0.10 | Dy | 0.50 | 0.10 | 0.00 | — | — | — | — | — | — | — | — | — | — | — |
| Specimen No. 20 | 0.10 | 0.80 | 0.10 | Ho | 0.50 | 0.10 | 0.00 | — | — | — | — | — | — | — | — | — | — | — |
| Specimen No. 21 | 0.10 | 0.80 | 0.10 | Er | 0.50 | 0.10 | 0.00 | — | — | — | — | — | — | — | — | — | — | — |
| Specimen No. 22 | 0.10 | 0.80 | 0.10 | Tm | 0.50 | 0.10 | 0.00 | — | — | — | — | — | — | — | — | — | — | — |
| Specimen No. 23 | 0.10 | 0.80 | 0.10 | Yb | 0.50 | 0.10 | 0.00 | — | — | — | — | — | — | — | — | — | — | — |
| Specimen No. 24 | 0.10 | 0.80 | 0.10 | Lu | 0.50 | 0.10 | 0.00 | — | — | — | — | — | — | — | — | — | — | — |
| Specimen No. 25 | 0.10 | 0.80 | 0.10 | LaSm | 0.50 | 0.10 | 0.00 | — | — | — | — | — | — | — | — | — | — | — |
| ✗Specimen No. 26 | 0.10 | 0.80 | 0.10 | La | 0.50 | 0.00 | 0.00 | — | — | — | — | — | — | — | — | — | — | — |
| Specimen No. 27 | 0.10 | 0.80 | 0.10 | La | 0.50 | 0.10 | 0.00 | — | — | — | — | — | — | — | — | — | — | — |
| Specimen No. 28 | 0.10 | 0.80 | 0.10 | La | 0.50 | 0.20 | 0.00 | — | — | — | — | — | — | — | — | — | — | — |
| Specimen No. 29 | 0.10 | 0.80 | 0.10 | La | 0.50 | 0.30 | 0.00 | — | — | — | — | — | — | — | — | — | — | — |
| Specimen No. 30 | 0.10 | 0.80 | 0.10 | La | 0.50 | 0.50 | 0.00 | — | — | — | — | — | — | — | — | — | — | — |
| Specimen No. 31 | 0.10 | 0.80 | 0.10 | La | 0.50 | 0.80 | 0.00 | — | — | — | — | — | — | — | — | — | — | — |
| Specimen No. 32 | 0.10 | 0.80 | 0.10 | La | 0.50 | 1.00 | 0.00 | — | — | — | — | — | — | — | — | — | — | — |
| Specimen No. 33 | 0.10 | 0.80 | 0.10 | La | 0.50 | 0.10 | 0.05 | — | — | — | — | — | — | — | — | — | — | — |
| Specimen No. 34 | 0.10 | 0.80 | 0.10 | La | 0.50 | 0.10 | 0.10 | — | — | — | — | — | — | — | — | — | — | — |
| Specimen No. 35 | 0.10 | 0.80 | 0.10 | La | 0.50 | 0.10 | 0.50 | — | — | — | — | — | — | — | — | — | — | — |
| Specimen No. 36 | 0.10 | 0.80 | 0.10 | La | 0.50 | 0.10 | 1.00 | — | — | — | — | — | — | — | — | — | — | — |
| Specimen No. 37 | 0.10 | 0.80 | 0.10 | La | 0.50 | 0.10 | 0.00 | 0.05 | — | — | — | — | — | — | — | — | — | — |
| Specimen No. 38 | 0.10 | 0.80 | 0.10 | La | 0.50 | 0.10 | 0.00 | 0.10 | — | — | — | — | — | — | — | — | — | — |
| Specimen No. 39 | 0.10 | 0.80 | 0.10 | La | 0.50 | 0.10 | 0.00 | 1.00 | — | — | — | — | — | — | — | — | — | — |
| Specimen No. 40 | 0.10 | 0.80 | 0.10 | La | 0.50 | 0.10 | 0.00 | 10.00 | — | — | — | — | — | — | — | — | — | — |
| Specimen No. 41 | 0.10 | 0.80 | 0.10 | La | 0.50 | 0.10 | 0.00 | 20.00 | — | — | — | — | — | — | — | — | — | — |
| Specimen No. 42 | 0.10 | 0.80 | 0.10 | La | 0.50 | 0.10 | 0.00 | 30.00 | — | — | — | — | — | — | — | — | — | — |
| Specimen No. 43 | 0.10 | 0.80 | 0.10 | La | 0.50 | 0.10 | 0.00 | — | 1.00 | — | — | — | — | — | — | — | — | — |
| Specimen No. 44 | 0.10 | 0.80 | 0.10 | La | 0.50 | 0.10 | 0.00 | — | — | 1.00 | — | — | — | — | — | — | — | — |
| Specimen No. 45 | 0.10 | 0.80 | 0.10 | La | 0.50 | 0.10 | 0.00 | — | — | — | 1.00 | — | — | — | — | — | — | — |
| Specimen No. 46 | 0.10 | 0.80 | 0.10 | La | 0.50 | 0.10 | 0.00 | — | — | — | — | 1.00 | — | — | — | — | — | — |
| Specimen No. 47 | 0.10 | 0.80 | 0.10 | La | 0.50 | 0.10 | 0.00 | — | — | — | — | — | 1.00 | — | — | — | — | — |
| Specimen No. 48 | 0.10 | 0.80 | 0.10 | La | 0.50 | 0.10 | 0.00 | — | — | — | — | — | — | 1.00 | — | — | — | — |
| Specimen No. 49 | 0.10 | 0.80 | 0.10 | La | 0.50 | 0.10 | 0.00 | — | — | — | — | — | — | — | 1.00 | — | — | — |
| Specimen No. 50 | 0.10 | 0.80 | 0.10 | La | 0.50 | 0.10 | 0.00 | — | — | — | — | — | — | — | — | 1.00 | — | — |
| Specimen No. 51 | 0.10 | 0.80 | 0.10 | La | 0.50 | 0.10 | 0.00 | — | — | — | — | — | — | — | — | — | 1.00 | — |
| Specimen No. 52 | 0.10 | 0.80 | 0.10 | La | 0.50 | 0.10 | 0.00 | — | — | — | — | — | — | — | — | — | — | 1.00 |
| Specimen No. 53 | 0.10 | 0.80 | 0.10 | La | 0.50 | 0.10 | 0.00 | 5.00 | — | — | 3.00 | — | 3.00 | — | — | — | — | — |
| Specimen No. 54 | 0.10 | 0.80 | 0.10 | La | 0.50 | 0.10 | 0.00 | — | 5.00 | 1.00 | 1.00 | — | 0.05 | — | — | 10.00 | — | — |
| ✗Specimen No. 55 | 0.10 | 0.80 | 0.10 | La | 0.50 | 0.00 | 1.00 | 10.00 | — | — | — | — | — | — | — | — | — | — |
| Specimen No. 56 | 0.10 | 0.80 | 0.10 | Pr | 0.50 | 0.80 | 0.00 | 5.00 | — | — | — | — | — | — | — | — | — | — |
| Specimen No. 57 | 0.10 | 0.80 | 0.10 | Nd | 0.50 | 1.00 | 1.00 | — | — | — | — | — | — | — | — | 5.00 | — | — |
| Specimen No. 58 | 0.00 | 0.70 | 0.30 | — | 0.00 | 0.10 | 0.00 | — | — | — | — | — | — | — | — | — | — | — |
| Specimen No. 59 | 0.00 | 0.70 | 0.30 | — | 0.00 | 0.10 | 0.10 | — | — | — | — | — | — | — | — | — | — | — |
| Specimen No. 60 | 0.00 | 0.70 | 0.30 | — | 0.00 | 0.10 | 0.00 | — | — | — | — | — | 1.00 | — | — | — | — | — |
| Specimen No. 61 | 0.10 | 0.80 | 0.10 | La | 0.50 | 0.30 | 0.00 | — | — | — | — | — | — | — | — | — | — | — |
| Specimen No. 62 | 0.20 | 0.50 | 0.30 | Y | 0.50 | 0.20 | 0.00 | — | — | — | — | — | — | — | — | — | — | — |
| Specimen No. 63 | 0.20 | 0.50 | 0.30 | Y | 0.50 | 0.20 | 0.10 | — | — | — | — | — | — | — | — | — | — | — |

"—" described in Table 1 indicates that the corresponding component is not contained.
In addition, a specimen marked with ✗ means that the specimen is a comparative example.

The dielectric composition raw material thus obtained (100 parts by weight), a polyvinyl butyral resin (10 parts by weight), dibutyl phthalate (DOP) (5 parts by weight) as a plasticizer, and alcohol (100 parts by weight) as a solvent were mixed with a ball mill to obtain a paste, thereby producing a paste for a dielectric layer.

Further, apart from the above, Pd particles (44.6 parts by weight), terpineol (52 parts by weight), ethylcellulose (3 parts by weight), and benzotriazole (0.4 part by weight) were kneaded with a three-roll mill to obtain a slurry, thereby producing a paste for a Pd internal electrode layer.

In addition, similarly to the paste for a Pd internal electrode layer, a paste for a Ni internal electrode layer was produced using Ni particles.

Then, a regreen sheet was formed using the produced paste for a dielectric layer on a PET film to have a thickness after drying of 7 μm. Subsequently, an internal electrode layer was printed with a predetermined pattern using the paste for an internal electrode layer on the green sheet, and then the sheet was peeled off from the PET film to produce a green sheet having an internal electrode layer. Incidentally, the green sheets each having an internal electrode layer were produced while the paste for a Pd internal electrode layer was used in the green sheets using Specimen No. 1 to Specimen No. 60 and the paste for a Ni internal electrode layer was used in the green sheets using Specimen No. 61 to Specimen No. 63. Subsequently, a plurality if green sheets having an internal electrode layer were stacked and adhered by pressure to obtain a green multilayer body. This green multilayer body was cut in a predetermined size to obtain a green chip.

Then, the obtained green chip was subjected to a binder removal treatment (temperature increase rate: 10° C./hr, retention temperature: 400° C., temperature retention time: 8 hours, atmosphere: in air) and then subjected to firing (temperature increase rate: 200° C./hr, retention temperature: 1000 to 1400° C., temperature retention time: 2 hours, cooling rate: 200° C./hr, atmosphere: in air) to obtain a multilayer ceramic fired body.

The crystal structure of the dielectric layer of the obtained multilayer ceramic sintered body was subjected to X-ray diffraction (XRD) measurement, and as a result, it was confirmed that the tungsten bronze type composite oxide was obtained. In addition, the composition of the dielectric composition in the dielectric layer of the obtained capacitor element main body was measured by inductively coupled plasma source mass spectrometry (ICP-MS), and as a result, it was confirmed that the composition in Table 1 was obtained.

The end faces of the obtained multilayer ceramic fired body were polished by sandblasting, and then an In—Ga eutectic alloy was applied as an external electrode to obtain multilayer ceramic capacitors of Specimen No. 1 to Specimen No. 63 having the same shape as the multilayer ceramic capacitor illustrated in FIGURE. The sizes of the obtained multilayer ceramic capacitors were all 3.2 mm×1.6 mm×1.2 mm, the thickness of the dielectric layer was set to 5.0 μm, the thickness of the internal electrode layer was set to 1.5 μm, and the number of the dielectric layers interposed between the internal electrode layers was set to 10.

The voltage resistance, the specific permittivity (εs), the specific permittivity change ratio, and the specific resistance of the obtained multilayer ceramic capacitors of Specimen No. 1 to Specimen No. 63 were measured by the following methods and presented in Table 2.

Specific Permittivity (εs) and Specific Permittivity Change Ratio

The capacitance C was measured for the multilayer ceramic capacitor at 25° C. and 200° C. by a digital LCR meter (4284A manufactured by YHP) at a frequency of 1 kHz with a signal, which has an input signal level (measurement voltage) of 1 Vrms, being input. Then, the specific permittivity as (no unit of quantity required) was calculated on the basis of the thickness of the dielectric layer, the effective electrode area, and the capacitance C obtained as a result of the measurement. A higher specific permittivity was preferable and the specific permittivity of 500 or more was determined to be favorable. Further, a change ratio of a specific permittivity $\varepsilon_{200°\,C.}$ at 200° C. to a specific permittivity $\varepsilon_{25°\,C.}$ at 25° C. was calculated on the basis of Equation 1.

[Equation 1]

Specific permittivity temperature change ratio=$\{(\varepsilon_{200°\,C.}-\varepsilon_{25°\,C.})/\varepsilon_{25°\,C.}\}\times 100$     (1)

In the present example, the specific permittivity change ratio within ±20% was determined to be favorable.

Specific Resistance

Insulation resistance was measured for the multilayer ceramic capacitor specimen at 180° C. and 200° C. by a digital resistance meter (R8340 manufactured by ADVANTEST CORPORATION) under conditions of a measurement voltage of 30 V and a measurement time of 60 seconds. A value of specific resistance was calculated from the electrode area of the capacitor specimen and the thickness of the dielectric layer. Higher specific resistance was preferable, and the specific resistance was determined to be favorable when the specific resistance was $1.00\times10^{12}$ Ωcm or more and more preferably $9.00\times10^{12}$ Ωcm or more. When the specific resistance is low, leak current increases in the capacitor and malfunction occurs in an electric circuit.

Voltage Resistance

A DC voltage was applied to the multilayer ceramic capacitor specimen at 180° C. and 200° C. at a pressure increase rate of 100 V/sec, and a ease where leak current exceeds 10 mA was regarded as DC voltage resistance. Higher DC voltage resistance was preferable, and the DC voltage resistance was determined to be favorable when the DC voltage resistance was 150 V/μm or more, more preferably 155 V/μm or more, further preferably 160 V/μm or more, and particularly preferably 175 V/μm or more.

TABLE 2

|  | 25° C. Specific permittivity [—] | 200° C. Specific permittivity [—] | 200° C. Specific permittivity change ratio [%] | 180° C. Specific resistance [Ωcm] | 200° C. Specific resistance [Ωcm] | 180° C. Voltage resistance [V/μm] | 200° C. Voltage resistance [V/μm] |
|---|---|---|---|---|---|---|---|
| Specimen No. 1 | 693 | 566 | −18.3 | 3.21E+13 | 7.65E+12 | 165 | 162 |
| Specimen No. 2 | 654 | 527 | −19.4 | 3.24E+13 | 7.45E+12 | 164 | 161 |
| Specimen No. 3 | 602 | 501 | −16.8 | 3.22E+13 | 7.55E+12 | 158 | 154 |
| ✗Specimen No. 4 | 333 | 248 | −25.5 | 3.33E+13 | 7.23E+12 | 153 | 151 |
| Specimen No. 5 | 681 | 552 | −18.9 | 3.35E+13 | 7.57E+12 | 174 | 171 |
| Specimen No. 6 | 649 | 578 | −10.9 | 3.25E+13 | 7.61E+12 | 167 | 164 |
| Specimen No. 7 | 566 | 501 | −11.5 | 3.22E+13 | 7.39E+12 | 158 | 153 |
| ✗Specimen No. 8 | 358 | 258 | −27.9 | 3.13E+13 | 7.21E+12 | 157 | 152 |
| Specimen No. 9 | 578 | 508 | −12.1 | 3.35E+13 | 7.67E+12 | 164 | 167 |
| Specimen No. 10 | 575 | 510 | −11.3 | 3.41E+13 | 7.74E+12 | 163 | 164 |
| ✗Specimen No. 11 | 425 | 317 | −25.4 | 3.40E+13 | 7.51E+12 | 157 | 156 |
| Specimen No. 12 | 682 | 562 | −17.6 | 3.61E+13 | 7.46E+12 | 165 | 164 |
| Specimen No. 13 | 694 | 587 | −15.4 | 3.29E+13 | 7.66E+12 | 163 | 160 |
| Specimen No. 14 | 691 | 599 | −13.3 | 3.39E+13 | 7.84E+12 | 165 | 160 |
| Specimen No. 15 | 682 | 586 | −14.1 | 3.45E+13 | 7.67E+12 | 163 | 162 |

TABLE 2-continued

|  | 25° C. Specific permittivity [—] | 200° C. Specific permittivity [—] | 200° C. Specific permittivity change ratio [%] | 180° C. Specific resistance [Ωcm] | 200° C. Specific resistance [Ωcm] | 180° C. Voltage resistance [V/μm] | 200° C. Voltage resistance [V/μm] |
|---|---|---|---|---|---|---|---|
| Specimen No. 16 | 684 | 576 | −15.8 | 3.31E+13 | 7.45E+12 | 167 | 161 |
| Specimen No. 17 | 687 | 590 | −14.1 | 3.25E+13 | 7.37E+12 | 165 | 161 |
| Specimen No. 18 | 690 | 578 | −16.2 | 3.39E+13 | 7.63E+12 | 162 | 162 |
| Specimen No. 19 | 691 | 574 | −16.9 | 3.35E+13 | 7.74E+12 | 164 | 157 |
| Specimen No. 20 | 694 | 567 | −18.3 | 3.27E+13 | 7.64E+12 | 165 | 161 |
| Specimen No. 21 | 686 | 561 | −18.2 | 3.31E+13 | 7.48E+12 | 167 | 157 |
| Specimen No. 22 | 692 | 571 | −17.5 | 3.33E+13 | 7.58E+12 | 165 | 157 |
| Specimen No. 23 | 684 | 589 | −13.9 | 3.41E+13 | 7.36E+12 | 166 | 161 |
| Specimen No. 24 | 687 | 578 | −15.9 | 3.40E+13 | 7.58E+12 | 164 | 163 |
| Specimen No. 25 | 693 | 584 | −15.7 | 3.45E+13 | 7.68E+12 | 163 | 161 |
| ✕Specimen No. 26 | 691 | 582 | −15.8 | 2.54E+13 | 5.44E+12 | 138 | 137 |
| Specimen No. 27 | 651 | 549 | −15.7 | 3.35E+13 | 7.60E+12 | 164 | 159 |
| Specimen No. 28 | 1004 | 826 | −17.7 | 3.47E+13 | 8.65E+12 | 167 | 164 |
| Specimen No. 29 | 1168 | 958 | −18.0 | 5.58E+13 | 9.21E+12 | 175 | 174 |
| Specimen No. 30 | 1298 | 1079 | −16.9 | 3.78E+13 | 9.38E+12 | 184 | 181 |
| Specimen No. 31 | 1871 | 1625 | −13.1 | 3.56E+13 | 9.45E+12 | 183 | 182 |
| Specimen No. 32 | 2306 | 1958 | −15.1 | 3.52E+13 | 9.61E+12 | 184 | 184 |
| Specimen No. 33 | 661 | 586 | −11.3 | 3.27E+13 | 7.63E+12 | 166 | 160 |
| Specimen No. 34 | 638 | 537 | −15.8 | 3.38E+13 | 7.69E+12 | 168 | 167 |
| Specimen No. 35 | 578 | 510 | −11.8 | 3.35E+13 | 7.84E+12 | 169 | 165 |
| Specimen No. 36 | 575 | 511 | −11.1 | 3.37E+13 | 7.46E+12 | 170 | 171 |
| Specimen No. 37 | 688 | 581 | −15.6 | 3.34E+13 | 7.78E+12 | 165 | 159 |
| Specimen No. 38 | 689 | 598 | −13.2 | 3.31E+13 | 9.15E+12 | 176 | 170 |
| Specimen No. 39 | 685 | 574 | −16.2 | 3.28E+13 | 9.13E+12 | 181 | 177 |
| Specimen No. 40 | 691 | 582 | −15.8 | 3.39E+13 | 9.33E+12 | 179 | 178 |
| Specimen No. 41 | 684 | 589 | −13.9 | 3.45E+13 | 9.25E+12 | 178 | 176 |
| Specimen No. 42 | 598 | 523 | −12.5 | 3.44E+13 | 9.29E+12 | 158 | 157 |
| Specimen No. 43 | 689 | 601 | −12.8 | 3.39E+13 | 9.11E+12 | 181 | 178 |
| Specimen No. 44 | 692 | 580 | −16.2 | 3.37E+13 | 9.27E+12 | 180 | 176 |
| Specimen No. 45 | 684 | 593 | −13.3 | 3.34E+13 | 9.10E+12 | 178 | 176 |
| Specimen No. 46 | 693 | 577 | −16.7 | 3.54E+13 | 9.18E+12 | 182 | 179 |
| Specimen No. 47 | 683 | 568 | −16.8 | 3.51E+13 | 9.22E+12 | 184 | 180 |
| Specimen No. 48 | 687 | 566 | −17.6 | 3.42E+13 | 9.08E+12 | 183 | 181 |
| Specimen No. 49 | 688 | 573 | −16.7 | 3.48E+13 | 9.18E+12 | 185 | 182 |
| Specimen No. 50 | 681 | 588 | −13.7 | 3.39E+13 | 9.18E+12 | 182 | 180 |
| Specimen No. 51 | 693 | 592 | −14.6 | 3.47E+13 | 9.16E+12 | 181 | 177 |
| Specimen No. 52 | 691 | 596 | −13.7 | 2.36E+13 | 8.25E+12 | 172 | 168 |
| Specimen No. 53 | 690 | 577 | −16.4 | 3.32E+13 | 9.17E+12 | 183 | 179 |
| Specimen No. 54 | 689 | 561 | −18.6 | 3.58E+13 | 9.23E+12 | 182 | 180 |
| ✕Specimen No. 55 | 545 | 407 | −25.3 | 2.66E+13 | 5.32E+11 | 136 | 135 |
| Specimen No. 56 | 1711 | 1488 | −13.0 | 3.37E+13 | 9.11E+12 | 191 | 189 |
| Specimen No. 57 | 1678 | 1373 | −18.2 | 4.43E+13 | 9.46E+12 | 193 | 188 |
| Specimen No. 58 | 668 | 584 | −12.6 | 4.87E+13 | 7.74E+12 | 166 | 162 |
| Specimen No. 59 | 675 | 581 | −13.9 | 3.32E+13 | 7.76E+12 | 155 | 154 |
| Specimen No. 60 | 688 | 599 | −12.9 | 3.38E+13 | 7.48E+12 | 159 | 156 |
| Specimen No. 61 | 691 | 601 | −13.0 | 3.24E+13 | 7.36E+12 | 158 | 156 |
| Specimen No. 62 | 694 | 612 | −11.8 | 3.22E+13 | 7.13E+13 | 156 | 155 |
| Specimen No. 63 | 695 | 619 | −10.9 | 3.43E+13 | 7.28E+13 | 157 | 153 |

In addition, a specimen marked with ✕ means that the specimen is a comparative example.

As presented in Table 1 and Table 2, it was possible to confirm that the multilayer ceramic capacitor specimen of the present embodiment in which the R is at least one element selected from Y, La, Pr, Nd, Sm, Eu, Gd, Tb, Dy, Ho, Er, Tm, Yb, and Lu and s, t, x, a, and b satisfy $0.70 \leq s \leq 1.00$, $0 \leq t \leq 0.30$, $0.70 \leq s+t \leq 1.00$, $0 \leq x \leq 0.50$, $0.10 \leq a \leq 1.00$, and $0 \leq b \leq 1.00$ has a high specific permittivity at 25° C. and 200° C. of 500 or more, specific resistance at 180° C. or higher of $1.00 \times 10^{12}$ Ωcm or more, and DC voltage resistance at 180° C. or higher of 150 V/μm or more.

Further, it was possible to confirm that the multilayer ceramic capacitor specimen in which s and t in the chemical formula satisfy $0.80 \leq s \leq 1.00$, $0 \leq t \leq 0.20$, and $0.80 \leq s+t \leq 1.00$ has DC voltage resistance of 155 V/μm or more, that is, obtains higher DC voltage resistance.

Meanwhile, it is possible to confirm that the multilayer ceramic capacitor specimens (Specimen No. 4 and Specimen No. 8) in which s, t, and s+t do not satisfy $0.70 \leq s \leq 1.00$, $0 \leq t \leq 0.30$, and $0.70 \leq s+t \leq 1.00$ have a specific permittivity at 25° C. and a specific permittivity at 200° C. of less than 500.

Further, as presented in Table 1 and Table 2, the multilayer ceramic capacitor specimen (Specimen No. 11) in which the substitution amount x of R as the main component does not satisfy $0 \leq x \leq 0.50$ has a specific permittivity at 25° C. and a specific permittivity at 200° C. as low as less than 500.

As presented in Table 1 and Table 2, it was possible to confirm that the multilayer ceramic capacitor specimens (Specimen No. 1 to Specimen No. 8, Specimen No. 10 to Specimen No. 57, and Specimen No. 61 to Specimen No. 63) in which R as the main component is at least one element selected from Y, La, Pr, Nd, Sm, Eu, Gd, Tb, Dy, Ho, Er, Tm, Yb, and Lu exhibit the similar property as long as R is an element selected from the above-described elements.

As presented in Table 1 and Table 2, the multilayer ceramic capacitor specimens (Specimen No. 26 and Specimen No. 55) in which the substitution amount a of Zr as the main component does not satisfy 0.1≤a≤1.00 has low specific resistance at 200° C. and low DC voltage resistance at 180° C. or higher.

As presented in Table 1 and Table 2, also in the multilayer ceramic capacitor specimens (Specimen No. 33 to Specimen No. 36) in which Nb as the main component is substituted with Ta, it is possible to confirm that the similar property to the multilayer ceramic capacitor specimen (No. 27) in which Nb is not substituted with Ta is obtained. Moreover, it was found that, in Specimen No. 34 to Specimen No. 36 in which the substitution amount b of Ta is set to 0.10≤b≤1.00, further higher voltage resistance is obtained.

As presented in Table 2, it was possible to confirm that the multilayer ceramic capacitor specimens (Specimen No. 38 to Specimen No. 41) in which the molar quantity of the sub component with respect to 100 mol of the main component is 0.10 mol≤the sub component≤20.00 mol exhibit higher specific resistance at 200° C. of $9.00 \times 10^{12}$ Ωcm or more and have higher DC voltage resistance at 200° C. of 160 V/μm or more.

As presented in Table 2, the multilayer ceramic capacitor specimens (Specimen No. 39, Specimen No. 43 to Specimen No. 51, Specimen No. 53, Specimen No. 54, Specimen No. 56, and Specimen No. 57) in which at least one selected from Mn, Mg, Co, V, W, Mo, Si, Li, B, and Al is contained as a sub component exhibit higher specific resistance at 200° C. of $9.00 \times 10^{12}$ Ωcm or more and higher DC voltage resistance at 200° C. of 170 V/μm or more. On the other hand, the multilayer ceramic capacitor specimen (Specimen No. 52) in which Fe that is an element other than the above-described sub component is used as a sub component has specific resistance at 200° C. of less than $9.00 \times 10^{12}$ Ωcm and DC voltage resistance at 180° C. or higher of less than 170 V/μm. Therefore, it was possible to confirm that the sub component is preferably at least one selected from Mn, Mg, Co, V, W, Mo, Si, Li, B, and Al.

Specimen No. 39 to Specimen No. 51 in which at least one selected from Mn, Mg, Co, V, W, Mo, Si, Li, B, and Al is contained as a sub component and the substitution amount a of Zr as the main component is 0.30≤a≤1.00 have higher specific resistance and higher voltage resistance.

Also in Specimen No. 61 to Specimen No. 63 produced using a Ni internal electrode by reductive atmosphere firing, it was possible to confirm that the specific resistance, the DC voltage resistance, and the AC voltage resistance at 200° C. exhibit high values.

Comparative Example

In Specimen No. 64 and Specimen No. 65 presented in Table 3, multilayer ceramic capacitors were produced using a tungsten bronze type composite oxide containing an alkali metal element as a main component. The specific manufacturing method will be described below. Incidentally, a specimen marked with ✗ in Table 3 is a comparative example.

In Specimen No. 64 and Specimen No. 65, tungsten bronze type composite oxide $K(Sr_{0.3}Ba_{0.3}Ca_{0.4})_2Nb_5O_{15}$ powder containing an alkali metal element synthesized in advance was prepared as a main component, and $MnCO_3$ powder that is a raw material of a sub component to be added to the main component was prepared. Then, $K(Sr_{0.3}Ba_{0.3}Ca_{0.4})_2Nb_5O_{15}$ powder as the main component and $MnCO_3$ powder as the raw material of the sub component were weighed and mixed to have a predetermined ratio of the sub component to 100 mol of the main component, thereby preparing mixed powder.

The mixed powder of the main component and the sub component is used as a dielectric composition raw material.

A paste for a dielectric layer was produced in the similar manner to the example, except that the dielectric composition raw material was used, and a green sheet was formed on a PET film to have a thickness after drying of 7 μm. Then, an internal electrode layer was printed with a predetermined pattern on the green sheet using a paste for an internal electrode containing Ni as a main component, and then the sheet was peeled off from the PET film to produce a green sheet having an internal electrode layer. Subsequently, a green chip was obtained using the green sheet similarly to the example.

Then, the obtained green chip was subjected to a binder removal treatment (temperature increase rate: 10° C./hr, retention temperature: 350° C., temperature retention time: 8 hours, atmosphere in nitrogen) and subjected to firing (temperature increase rate: 200° C./hr, retention temperature: 1100° C., temperature retention time: 2 hours, cooling rate: 200° C./hr, oxygen partial pressure: $10^{-9}$ to $10^{-12}$ Pa, atmosphere: $H_2$—$N_2$—$H_2O$ mixed gas) to obtain a multilayer ceramic fired body.

Both end faces of the obtained multilayer ceramic fired body were applied with a Ag paste containing $B_2O_3$—$SiO_2$—BaO-based glass frit and subjected to a baking treatment (temperature: 800° C., atmosphere: $N_2$ gas) to obtain multilayer ceramic capacitors of Specimen No. 64 and Specimen No. 65 having the same shape as the multilayer ceramic capacitor illustrated in FIGURE. The sizes of the obtained multilayer ceramic capacitors were all 4.5 mm×3.2 mm×0.5 mm, the thickness of the dielectric layer was set to 6.0 μm, the thickness of the internal electrode layer was set to 1.5 μm, and the number of the dielectric layers interposed between the internal electrode layers was set to 5.

As for the obtained multilayer ceramic capacitors of Specimen No. 64 and Specimen No. 65, similarly to the example, the specific permittivity, the specific resistance, and the DC voltage resistance were measured and the results thereof were presented in Table 3.

TABLE 3

| | Main component composition | Accessory component [mol %] (with respect to 100 mol of main component) Mn | 25° C. Specific permittivity [—] | 180° C. Specific resistance [Ωcm] | 200° C. Specific resistance [Ωcm] | 180° C. Voltage resistance [V/μm] | 200° C. Voltage resistance [V/μm] |
|---|---|---|---|---|---|---|---|
| ✗Specimen No. 64 | $K(Sr_{0.3}Ba_{0.3}Ca_{0.4})_2Nb_5O_{15}$ | 40.00 | 1900 | 6.31E+09 | 1.51E+09 | 132 | 134 |
| ✗Specimen No. 65 | $K(Sr_{0.3}Ba_{0.3}Ca_{0.4})_2Nb_5O_{15}$ | 5.00 | 1900 | 3.98E+09 | 9.56E+08 | 132 | 133 |

As presented in Table 3, it is possible to confirm that Specimen No. 64 and Specimen No. 65 that are a tungsten bronze type composite oxide containing an alkali metal element as a main component have low values of the voltage resistance and the specific resistance since a lattice defect caused by the alkali metal element with high volatility easily occurs and the conduction electron is easily generated.

INDUSTRIAL APPLICABILITY

The dielectric composition of the present invention can be applied under the environment close to an engine room as an in-vehicle electronic component since the dielectric composition has high DC voltage resistance and high specific resistance in a high-temperature region of 200° C. and also has a high specific permittivity, and can be also applied to use application as an electronic component mounted in the vicinity of a power device using a SiC- or GaN-based semiconductor.

EXPLANATIONS OF LETTERS OR NUMERALS

1 MULTILAYER CERAMIC CAPACITOR
2 DIELECTRIC LAYER
3 INTERNAL ELECTRODE LAYER
4 EXTERNAL ELECTRODE
10 CAPACITOR ELEMENT MAIN BODY

The invention claimed is:

1. A dielectric composition comprising, as a main component, a tungsten bronze type composite oxide represented by a chemical formula $(Sr_{1.00-s-t}Ba_sCa_t)_{6.00-x}R_x(Ti_{1.00-a}Zr_a)_{x+2.00}(Nb_{1.00-b}Ta_b)_{8.00-x}O_{30.00}$,
    wherein the R is at least one element selected from the group consisting of Y, La, Pr, Nd, Sm, Eu, Gd, Tb, Dy, Ho, Er, Tm, Yb, and Lu, and s, t, x, a, and b satisfy $0.70 \leq s \leq 1.00$, $0 \leq t \leq 0.30$, $0.70 \leq s+t \leq 1.00$, $0.25 \leq x \leq 0.50$, $0.10 \leq a \leq 1.00$, and $0 \leq b \leq 1.00$.

2. The dielectric composition according to claim 1, wherein at least one selected from the group consisting of Mn, Mg, Co, V, W, Mo, Si, Li, B, and Al is contained as a sub component in 0.10 mol or more and 20.00 mol or less with respect to 100 mol of the main component.

3. The dielectric composition according to claim 1, wherein a substitution amount a of Zr in the chemical formula is $0.50 \leq a \leq 1.00$.

4. A dielectric element comprising the dielectric composition according to claim 1.

5. An electronic component comprising a dielectric layer comprising the dielectric composition according to claim 1.

6. A multilayer electronic component comprising a multilayer portion wherein a dielectric layer comprising the dielectric composition according to claim 1 and an internal electrode layer are stacked alternately.

* * * * *